United States Patent [19]

Sisoler et al.

[11] 4,279,634
[45] Jul. 21, 1981

[54] DAM CONSTRUCTION FOR CONTROLLING TIN CURRENTS IN A FLOAT GLASS CHAMBER

[75] Inventors: Gabriel M. Sisoler, Sterling Heights; Vincent L. Spade, Chelsea; James P. Sowman, Farmington Hills; Larry J. Casterwiler, Taylor, all of Mich.; Bernard Puma, Nashville, Tenn.

[73] Assignee: Ford Motor Company, Dearborn, Mich.

[21] Appl. No.: 99,766

[22] Filed: Dec. 3, 1979

[51] Int. Cl.³ .............................................. C03B 18/18
[52] U.S. Cl. .................................. 65/182.3; 65/99 A; 65/182.5
[58] Field of Search ................ 65/99 A, 182 R, 182.1, 65/182.3, 182.4, 182.5

[56] References Cited

U.S. PATENT DOCUMENTS

| | | | |
|---|---|---|---|
| 3,607,199 | 9/1971 | Itakura et al. | 65/182 R |
| 3,925,051 | 12/1975 | Lawhon | 65/99 A |
| 4,131,446 | 12/1978 | Dickenson | 65/99 A |
| 4,183,239 | 2/1979 | Nier et al. | 65/99 A |

*Primary Examiner*—Arthur D. Kellogg
*Attorney, Agent, or Firm*—William E. Johnson; Olin B. Johnson

[57] ABSTRACT

This specification is directed to a dam structure which may be used in a float glass chamber for separating a hot entry end of the chamber from a cold exit end of the chamber. The dam has been specially designed so that it will mix tin currents sheared from a glass ribbon moving thereover of higher temperature with colder tin moving around the edges of the dam and returning from downstream of the float chamber. The mixing of the tin currents occurs at a position spaced outwardly fromm the position of movement of the glass ribbon over the dam so that glass ribbon is not subjected to zones of tin having varying temperatures which could cause optical distortions therein.

3 Claims, 4 Drawing Figures

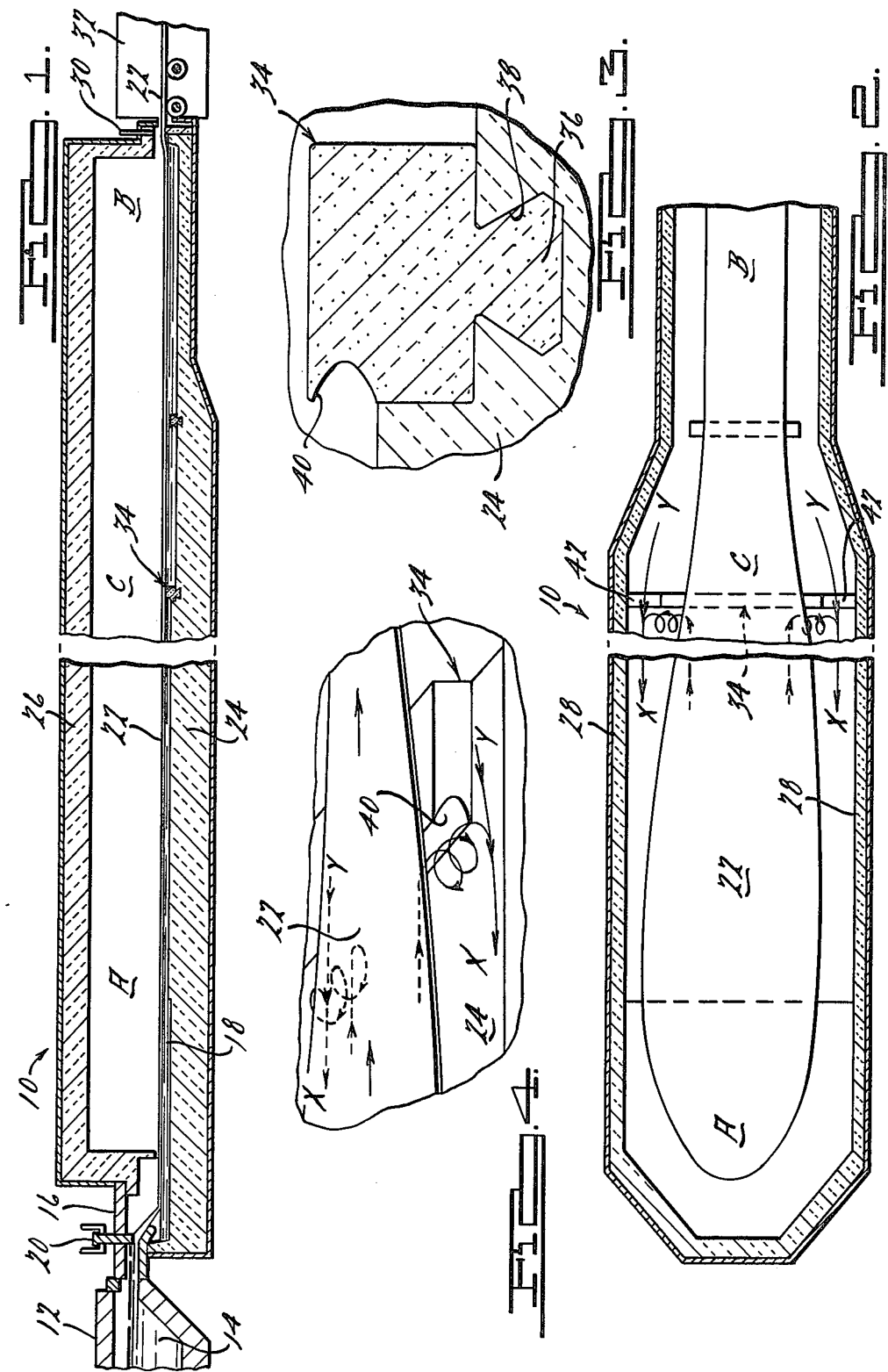

DAM CONSTRUCTION FOR CONTROLLING TIN CURRENTS IN A FLOAT GLASS CHAMBER

BACKGROUND OF THE INVENTION AND PRIOR ART STATEMENT

U.S. Pat. No. 4,131,446 issued on Dec. 26, 1978 for a "Method and Apparatus for Manufacturing Flat Glass on Molten Metal."

Basically, this patent discloses a flat glass manufacturing process in which the glass is developed by a float process which occurs on a molten metal bath. In such a glass manufacturing process, there is a forward flow of molten metal along the length of the bath. This flow is caused because the upper part of the molten metal is entrained by accelerating glass thereover. This forward flow moves over a return flow of cooler molten metal which is moving in a deeper region of the bath.

The patent teaches a construction in which cooler return molten metal flow is drawn from a deeper, colder region of the bath to replenish the forward flow of molten metal entrained by the accelerating ribbon which is moved from an entry end of the bath to an exit end thereof. The patent teaches the use of a barrier 35 which extends partially across the float glass chamber at that portion of the chamber where the stretching of the glass is carried out to reduce the glass to its final width dimension. The barrier 35 is best shown in FIG. 3 of the patent and best described in the patent commencing at line 6 of column 6.

The barrier 35 extends substantially most of the distance across the width of the float glass chamber, but does not extend into contact with the side walls of the chamber. This permits flow between the ends of the barrier and the side walls of the chamber. The flow permitted in this region is a return flow of cooler tin from the exit end of the chamber towards the hot end of the chamber, that is the entry end of the chamber through which molten glass is poured on the molten metal.

As is shown in the drawings of this patent, the barrier 36 has a relatively flat face facing against the direction of movement of the ribbon of glass which is moving thereover. Column 6 of this patent, at line 13, indicates, "The barrier 35 insures that the lower layers of entrained molten metal of the forward flow are directed downwardly and then upstream as indicated by arrow 38 in FIG. 3." Arrow 38 of FIG. 3 indicates that the molten tin is essentially sheared off from the moving ribbon of glass 8 and doubled back against the direction of movement of the glass ribbon thereover.

At column 6, line 43 of the patent, it is further stated, "From the foregoing, it is seen that the barrier 35 is at a location in the region of the downstream end of the attenuation zone and constrains molten metal flow at that location to forward flow entrained beneath the ribbon and counterflow alongside the ribbon from downstream of that location. The barrier 35 thus obstructs direct return flow of molten metal along the bath bottom into the region upstream of the barrier location, but permits counterflow around the ends of the barrier from the region of greater bath depth thereby establishing lateral access to the region of the bath supporting ribbon as it is being attenuated by acceleration of the glass upstream of the barrier location."

We have found that the flat front face construction of the barrier 35 shown in the patent allows cold return tin to immediately move under the ribbon of glass in a turbulent manner. This turbulent flow penetrates into the forward flowing molten tin thereby causing local, variable chilling of the bottom surface of the glass ribbon. This action also does not provide for a good intermixing of the cold tin flowing upstream with the warmer tin which has been sheared off of the glass ribbon passing over the top of the barrier.

The principal objects of this invention are to provide a barrier structure or dam for a float glass chamber which provides an outwardly flowing force of hot tin from the dam which prevents cold tin from flowing under the moving glass ribbon and which insures a thorough intermixing of molten tin sheared off of the tin currents moving wth a moving glass ribbon and tin returning from a downstream location in the float chamber.

It is still an additional object of this invention to provide such a barrier structure or dam for a float glass chamber which insures the mixing of warm and cold tin currents at a location spaced outwardly from underneath the ribbon of glass moving over the dam so that the ribbon of glass is not subjected to tin of varying temperatures which could cause optical distortion in the glass ribbon being manufactured.

U.S. Pat. No. 4,131,446 appears to contain the most relevant description of dams used in float glass chambers for controlling tin currents. Many other patents show or briefly discuss dams or other devices for controlling tin currents. Other patents which may be of interest include: U.S. Pat. Nos. 3,615,315; 3,770,407; 3,790,361; 3,930,828; 3,930,829 and 3,954,432. These patents are not as relevant to the subject matter of this specification as the aforementioned U.S. Pat. No. 4,131,446.

SUMMARY OF THE INVENTION

This invention relates to an improvement in the construction of a float glass chamber and, more particularly, to an improvement in a float glass chamber construction in which a dam extending transversely across most of the width of the float chamber is used to control the mixing of hot and cold tin currents. By the construction of this invention, the mixing of the hot and cold tin currents is achieved at a location outside of the area over which the glass ribbon formed on the molten tin bath is travelling. The dam construction taught herein reduces the amount of distortion produced in the glass ribbon by turbulent and variable hot and cold tin currents occurring adjacent the bottom side of the glass ribbon in a final attenuation zone of the float chamber.

The construction of this invention finds its place in a float glass chamber in which molten tin is confined in a refractory structure to define a molten tin bath. This molten tin bath has a depth dimension as well as dimensions extending along the length and width of the float glass chamber. The molten tin bath provides an upper surface over which molten glass may be processed to form a ribbon of glass. The molten glass is received on the molten tin bath in a hot entry end of the float glass chamber. Thereafter, the molten glass is moved lengthwise along the molten tin bath towards a cool exit end of the float glass chamber. The molten glass stiffens as it moves from the entry end of the chamber to the exit end of the chamber thereby to form a ribbon of glass.

In accordance with the teachings of this invention, the float glass chamber is improved by including therein the following construction. A dam element is mounted below and extends across most of the width of the molten tin bath at a position located along the length of the float chamber. The dam element separates hot tin in the hot entry end of the chamber from cold tin in the cold exit end of the chamber. This submerged dam element extends across at least the width of the molten tin covered by the glass ribbon moving thereover. The dam element is designed to engage currents of hot tin moving toward the exit end of the float glass chamber. The tin is moved toward the exit end of the chamber because it is entrained by the ribbon of glass moving towards the exit end of the float glass chamber. The dam element is designed so that it imparts to the engaged tin currents an outwardly directed flow towards the sides of the float glass chamber. By directing these hot tin currents outwardly toward the sides of the float glass chamber, the tin currents are directed into engagement with cold tin currents which are returning from the exit end of the float glass chamber toward the entry end of the float glass chamber. The engagement of the two tin currents takes place in a position located between the edges of the dam element and the side walls of the float chamber. When the outwardly directed hot tin currents engage the cold tin currents, they mix therewith in order to develop a uniform temperature throughout the entire tin flow. The mixing of the tin currents takes place at a location along the side edges of the float glass chamber, which is a location spaced outwardly from underneath the glass ribbon being formed on the molten metal bath. In this manner, the mixing of the tin currents does not take place underneath the glass ribbon and the glass ribbon is therefore not subjected to zones of tin of varying temperature which can cause the development of distortions in the glass ribbon by differential cooling of localized zones of glass.

In accordance with a preferred embodiment of this invention, the dam element has a front face on the side of the dam element engaged by the hot tin current. The dam element's front face is so constructed and arranged as to develop the required outwardly directed flow of tin currents. In the preferred embodiment disclosed herein, this front face of the dam element has a shape which, when viewed looking at the front face from the direction the glass ribbon is coming, is concave inwardly into the dam element. This concave shape is designed to develop the required outwardly directed flow from the center of the dam element toward the side edges of the float glass chamber. This outwardly directed flow generates the mixing of hot tin currents and cold tin currents along the side edges of the float glass chamber, rather than beneath the glass ribbon passing thereover.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like characters indicate like parts throughout several figures, and in which:

FIG. 1 is an elevation view, in cross-section, showing a float glass chamber including the improvement of this invention;

FIG. 2 is a plan view, in cross-section, of the improved float chamber of FIG. 1;

FIG. 3 is an enlarged view, in cross-section, of the preferred construction of the dam element shown in FIGS. 1 and 2; and FIG. 4 is an isometric view of the dam element used in the float chamber pictorially illustrating the manner in which that member functions to control movement of tin currents in the float chamber.

DESCRIPTION OF THE PREFERRED EMBODIMENT

Construction

In FIGS. 1 and 2, there is shown a float glass chamber generally identified by the numeral 10. In FIG. 1, there is seen the delivery end of a conventional glass melting furnace 12 in which a constant level of molten glass 14 is maintained. The molten glass is delivered through a float bath delivery chamber 16 onto the surface of a bath of molten tin 18. A tweel 20 controls the rate of glass flow from the furnace 12. The molten tin bath 18 has a density greater than that of the molten glass 14 so the glass will flow out on the surface thereof. By delivering molten glass at a constant rate and by withdrawing a continuous sheet of glass thus formed at a constant rate, a continuous ribbon of glass 22 is produced.

The chamber 10 has a lower refractory section 24 and an upper refractory section 26, as shown in FIG. 1. Also, as shown in FIG. 2, the float glass chamber 10 has side refractory sections 28—28.

As is well known in the art, the float glass chamber 10 has a hot entry zone generally designated by the letter A, and a cooler exit zone generally designated by the letter B. In the entry zone, the glass is in a molten condition, but in the exit zone of the chamber, the glass is stiffened sufficiently that it may be picked up from the tin and removed from the float glass chamber through an exit 30 of the chamber 10. After being removed from the chamber, the ribbon of glass 22 is cooled in an annealing lehr in order to achieve the proper distribution of thermal stresses therethrough.

Intermediate the entry and exit zones of the float glass chamber is a glass stretching zone identified by the letter C. In this region, the glass ribbon 22 has a temperature intermediate the entry and exit zones. The temperature of the glass in this region permits a stretching thereof when force is applied thereto. As is observed in FIG. 2, when the stretching force is applied to the glass ribbon, the glass ribbon necks down to form a ribbon of glass having desired finish thickness and width dimensions.

In accordance with the teachings of this invention, a dam member generally designated by the numeral 34 is used to separate the entry zone of the chamber 10 from the cooler exit zone thereof. The dam member taught in this specification is best illustrated in FIGS. 3 and 4. The dam member is designed to achieve certain desired functions in shearing tin currents away from being carried along with the ribbon of glass 22 moving thereover. The dam is so constructed and arranged that tin sheared from the glass ribbon 22 is directed into outwardly directed flow patterns. These flow patterns result in better tin mixing being carried out in the float chamber, as will be described in greater detail in the operational section of this specification.

In accordance with a preferred embodiment of this invention, the dam member 34 includes a dovetail portion 36 located on the bottom thereof. The dovetail portion 36 is received in a suitably shaped keyway 38 formed in the lower refractory section 24. The depth of the molten tin 18 above the dam member 34 is greater downstream of the dam member in the direction of movement of the glass ribbon 22 than upstream thereof. The purpose of providing the difference in depth on either side of the dam member 34 is fully explained in the aforementioned U.S. Pat. No. 4,131,446.

In accordance with the teachings of this invention, the dam member 34 has a front face 40 on the hot tin side of the member. This front face is concave in configuration in the direction of movement of the glass ribbon 22 over the top of the dam member 34. In accordance with the teachings of this preferred embodiment, the concave shape is in the form of a parabolic curve. As is best seen in FIG. 2, the dam member 34 is slightly wider than the width of the glass ribbon 22 passing thereover. In this manner, openings 42—42 are provided on each side of the dam member 34 between itself and the opposite side refractory sections 28—28 of the float glass chamber 10. The dam member 34 may be made of any suitable material that is tin and temperature resistant, and preferably it is made of graphite.

After having described the construction of the improved float chamber of this specification, a discussion will be undertaken hereinbelow of the operation of that chamber.

Operation

As the ribbon of glass 22 moves from the entry end of the float glass chamber 10 to the exit end thereof, the glass is stretched in the stretching zone C. During this operation, the rate of movement of the glass ribbon 22 is increasing in the stretching zone C and there is progressively increasing entrainment of molten tin bath 18 in a forward surface flow which travels towards the exit end of the float chamber 10. This flow is caused by the drag of the ribbon of glass 22 across the upper surface of the molten tin bath 18. This forward surface flow is over an upstream return flow of cooler molten tin from the exit zone B of the float glass chamber. The returning molten tin is continuously being drawn underneath the ribbon of glass 22 to compensate for that molten tin which is entrained and moved along with the ribbon of glass. It is the generalized return flow of cooler molten tin along the bottom of the float glass chamber which produces top to bottom temperature gradients through the depth of the molten metal. These variations have been shown to be particularly troublesome in the region of the bath where the stretching is taking place and where the glass ribbon is rapidly accelerating.

The dam member 34 constructed in accordance with the teachings of this invention has been so designed as to minimize the distortional effects that can be produced by having tin of various temperatures present in the chamber.

In accordance with the teachings of this invention, the front face 40 of the dam member 34 is so constructed and arranged that molten tin entrained by movement of the glass ribbon 22 thereover is engaged and given an outward direction of movement, as is indicated by arrow X of FIG. 4. Thus, most of the molten metal which is entrained by movement of the glass ribbon 22 is sheared off and caused to flow from the center line of the dam in an outward direction to the ends of the dam at which point the sheared tin currents are generally moving toward the hot end of the float bath chamber 10. When the dam face has the parabolic curve shape of the preferred design, the outwardly directed flow is spiralling as it moves toward the edge of the dam element.

At this same location, tin currents generally designated by the letter Y are returning from the cooler zone B of the float chamber 10. These cooler currents Y are moving around the dam member 34 through the openings 42—42 between the dam member and the side refractory sections 28—28 of the float glass chamber 10. At such a position, the cold tin currents Y are engaged by the sheared tin currents X having higher temperature and intermixing of the two tin currents takes place at a position adjacent the side refractory sections 28—28 of the float bath chamber 10. When the mixing of the these two currents takes place at such a location, the mixing action is spaced outwardly from the side edges of the ribbon of glass 22 moving over the surface of the molten tin bath 18. Since the mixing of the cold and warm tin currents takes place outside the edge of the ribbon, the ribbon is not subjected to zones of tin having differential temperatures and, therefore, is less likely to develop stretch patterns induced by such contact. When the tin currents are finally drawn back underneath the ribbon 22, they are drawn back in a condition in which they are thoroughly mixed and generally homogeneous with respect to temperature.

Therefore, the basic concept set forth in this specification is one in which the dam member is so designed that it will shear tin from movement along with the ribbon of glass and direct that sheared tin outwardly from underneath the ribbon of glass. The outwardly directed sheared tin currents are brought into mixing relationship with cooler tin currents returning from downstream of the float glass chamber. The mixing of the sheared tin currents and the cooler tin currents occurs at a location spaced outside of a position underneath the glass ribbon moving over the molten tin bath. The mixing action occurs outside of the ribbon of glass being formed on the molten tin bath and, therefore, the deleterious effects of having multitemperature zones of tin underneath the glass ribbon is eliminated.

While particular embodiments of the invention have been illustrated and described, it will be obvious to those skilled in the art that various changes and modifications may be made without departing from the invention. For example, two or more such dam elements may be used to provide additional division of the float chamber. It is intended to cover in the appended claims all such modifications and equivalents as fall within the true spirit and scope of this invention.

What is claimed is:

1. In a float glass chamber in which molten tin is confined in a refractory structure to define a molten tin bath having a depth dimension as well as dimensions extending along the length and the width of said float glass chamber, said molten tin bath providing an upper surface over which molten glass may be processed to form a glass ribbon, said molten glass being received on said molten tin bath in a hot entry end of said float glass chamber and thereafter being moved lengthwise along said molten tin bath towards a cold exit end of said float glass chamber to solidify and form a ribbon of glass;

the improvement comprising:

a dam member mounted below the surface of said molten tin bath at a position along the length of said float glass chamber to separate hot tin in said hot entry end of said float glass chamber from cold tin in said cold exit end of said float glass chamber, said dam member having an upstream face facing said hot entry end of said float glass chamber and a downstream face facing said cold exit end of said float glass chamber, said dam member having formed on its upstream face a concave surface so constructed and arranged that molten tin currents engaged by said concave surface of said upstream face of said dam member will be redirected into an outwardly directed flow toward the sides of said float glass chamber, said dam member terminating at locations spaced from said side walls of said float glass chamber so that molten tin from said cold exit end of said float glass chamber may move therepast toward said hot entry end of said float glass chamber, said outwardly directed flows of molten tin from said upstream face of said dam member substantially mixing with said returning cold tin at an area along the sides of said float glass chamber at a location away from said ribbon of glass forming on said molten tin bath.

2. The improved float glass chamber as defined in claim 1, wherein:
said concaved surface of said upstream face of said dam member is formed as a parabolic curve.

3. The improved float glass chamber as defined in claim 1, wherein:
a second dam member is located in said float glass chamber between said dam member and said exit end of said float glass chamber.

* * * * *